US006414694B1

United States Patent
Byun

(10) Patent No.: US 6,414,694 B1
(45) Date of Patent: Jul. 2, 2002

(54) CIRCUIT AND METHOD FOR COMPENSATING HORIZONTAL CENTERING IN VIDEO DISPLAY APPARATUS

(75) Inventor: Ho-Jin Byun, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/417,758

(22) Filed: Oct. 14, 1999

(30) Foreign Application Priority Data

Oct. 14, 1998 (KR) ............................. 98-42914

(51) Int. Cl.[7] ................................ G09G 5/00
(52) U.S. Cl. .................... 345/698; 345/213; 348/536
(58) Field of Search ..................... 345/212, 10, 651, 345/652, 654, 662, 213; 315/370

(56) References Cited

U.S. PATENT DOCUMENTS

| | | | | |
|---|---|---|---|---|
| 4,954,757 A | * | 9/1990 | Berwin ...................... 315/370 |
| 6,091,212 A | * | 7/2000 | Park .......................... 315/370 |
| 6,115,009 A | * | 9/2000 | Ikegami ...................... 345/10 |
| 6,285,344 B1 | * | 9/2001 | Everard et al. ............... 345/3 |

* cited by examiner

Primary Examiner—Steven Saras
Assistant Examiner—Christopher J. Maier
(74) Attorney, Agent, or Firm—Robert E. Bushnell, Esq.

(57) ABSTRACT

A circuit for compensating a horizontal centering in a video display apparatus includes a control circuit, a horizontal centering compensation circuit, and a horizontal deflection output circuit. The circuit functions such that even when the video display mode of a multi-mode monitor is shifted, any biasing of the picture can be automatically minimized or prevented. The control unit counts the frequency of externally input video synchronizing signals to output a first switching control signal or a second switching control signal based on the counted result of the frequency of the video synchronizing signals. The horizontal centering compensation circuit provides a first power and a second power, the first and second powers having voltage levels and directions different from each other, to output the first power or the second power in response to the first switching control signal or the second switching control signal of the control unit. The horizontal deflection output circuit receives a driving power, to generate a magnetic field for deflecting electron beams in response to externally input horizontal driving signals, so as to variably adjust a horizontal center position of a picture displayed on a video display apparatus in accordance with the first power and the second power of the horizontal centering compensation circuit. Accordingly, even when a video card is replaced in a multi-mode monitor, the horizontal centering of the picture can be exactly compensated.

20 Claims, 3 Drawing Sheets

CIRCUIT AND METHOD FOR COMPENSATING HORIZONTAL CENTERING IN VIDEO DISPLAY APPARATUS

CLAIM OF PRIORITY

This application makes reference to, incorporates the same herein, and claims all benefits accruing under 35 U.S.C. §119 from my application A CONTROL CIRCUIT FOR HORIZONTAL CENTERING OF A MONITOR filed with the Korean Industrial Property Office on Oct. 14, 1998 and there duly assigned Ser. No. 42914/1998.

BACKGROUND OF THE INVENTION

1. Field of the Invention

The present invention relates to a horizontal centering compensation circuit for a video display apparatus. More specifically, the present invention relates to a circuit for compensating a horizontal centering in a video display apparatus. Further, even when the video display mode of a multi-mode monitor is shifted, the present invention promotes automatically minimizing or preventing any biasing of the picture displayed on a video display apparatus.

2. Description of the Related Art

Recently, in accordance with the progress of computer systems, there have been developed multi-mode monitor systems which are capable of supporting various resolutions.

A multi-mode monitor refers to a monitor in which the monitor has a compatibility with at least two or more video modes. Each time when the supporting mode is shifted in a video cassette, the picture size and position are varied, the horizontal and vertical synchronization are realized, the deflecting section is optimized, and various bias correcting circuits are re-adjusted.

Particularly, in recent times, direct current (dc) currents are added to the deflecting currents which deflect the electron beams in a cathode ray tube, thereby making it possible to variably move the horizontal axis of the picture. A compensation circuit, in this regard, has been generally adopted.

Referring to FIG. 1, FIG. 1 is a circuit diagram illustrating a conventional horizontal centering compensation circuit for adjusting the horizontal center position of the picture. As shown in FIG. 1, the conventional horizontal centering compensation circuit 300 is connected to a horizontal deflecting coil L1 of a horizontal deflection output circuit 100, for adding a magnitude-different and direction-different direct current (dc) current to the deflecting current which flows through the horizontal deflecting coil L1.

As shown in FIG. 1, the horizontal deflection output circuit 100 includes: a horizontal output transistor Q1 that is switched by the output signals of a horizontal driving circuit 10; a damping diode D1 connected in parallel to the horizontal output transistor Q1; a retrace capacitor C1 connected in parallel to the damping diode D1; and the horizontal deflecting coil L1 connected in parallel to the retrace capacitor C1.

Thus, the horizontal output transistor Q1 is turned on or off in accordance with on or off output signals of the horizontal driving circuit 10. Further, the deflecting current which is supplied to the horizontal deflecting coil L1 during the turn-on period of the horizontal output transistor Q1 is charged into the retrace capacitor C1 during the turn-off period of the horizontal output transistor Q1, and then is discharged to the horizontal deflecting coil L1. Through this procedure, a saw tooth shaped deflecting current is supplied to the horizontal deflecting coil L1. Thus, magnetic fields which are generated from the horizontal deflecting coil L1 deflect the electron beams of a cathode ray tube of a video display apparatus.

The horizontal centering compensation circuit 300 which is connected to the horizontal deflection output circuit 100 includes: a horizontal position adjusting coil L3 connected in parallel to the horizontal deflecting coil L1; and a movable terminal a and first fixed terminal b and a second fixed terminal c of a switch SW1. By the switch SW1, the movable terminal a is connected to the horizontal position adjusting coil L3 and, by the switch SW1, the first fixed terminal b is connected through a first diode D2, a resistor R1 and a coil L2 to a step-up converter 12, while the second fixed terminal c is connected through a second diode D3 and a capacitor C2 to the ground GND. As illustrated in FIG. 1, the first diode D2 and the second diode D3 are connected in the mutually opposite directions.

Therefore, if the axis of the picture is biased to the left side or right side in the high frequency band, then the movable terminal a of the switch SW1 can be connected to the first fixed terminal b or the second fixed terminal c, so as to bring the horizontal axis of the picture to the center. First, if the movable terminal a is connected to the first fixed terminal b, the output signals of the step-up converter 12 are supplied through the coil L2, the resistor R1 and the first diode D2 to the horizontal position adjusting coil L3.

Accordingly, a direct current (dc) current having a magnitude and direction is supplied to the horizontal deflecting coil L1, and the center position of the picture moves in accordance with the direction and degree of the horizontal raster shift which is adjusted by the impedances of the horizontal position adjusting coil L3, the coil L2 and the resistor R1.

Meanwhile, if the movable terminal a of the switch SW1 is connected to the second fixed terminal c, then the current of the horizontal position adjusting coil L3 is grounded through the second diode D3 and the capacitor C2. Accordingly, a direct current (dc) current which has an opposite direction and a different magnitude from the above described direct current (dc) current supplied when the movable terminal a is connected to the first fixed terminal b is supplied to the horizontal deflecting coil L1.

As described above, in the conventional horizontal centering compensation circuit 300, the horizontal axis of the picture moves in opposite directions in accordance with which fixed terminal b or c the movable terminal a is connected. Therefore, the picture which is biased to the left or right can be brought to the center of the screen. However, this conventional horizontal centering compensation circuit of FIG. 1 is for correcting the left and right bias at a radio frequency band. Therefore, when the video display mode is shifted, such as when a video card is replaced with another video card in a computer system, an accurate horizontal centering can become difficult.

SUMMARY OF THE INVENTION

An object among other objects of the present invention is to promote overcoming the above described disadvantage of accurate horizontal centering when a video card is replaced in the aforementioned conventional technique.

Therefore it is an object among other objects of the present invention to provide a circuit for compensating a horizontal centering in a video display apparatus, in which even when the video display mode of a multi-mode monitor is shifted, any biasing of the picture can be automatically corrected.

In achieving the above object and other objects of the present invention, a circuit for compensating a horizontal centering in a video display apparatus according to the present invention includes: a control unit for counting a frequency of externally inputted video synchronizing signals to selectively output a first switching control signal and a second switching control signal based on counted result of the frequency of the externally input video synchronizing signals; a horizontal centering compensation circuit for providing a first power having a first voltage level and second power having a second voltage level, the first power and the second power having respective voltage levels and directions different from each other, to selectively output the first power and the second power in response to a respective one of the first switching control signal and the second switching control signal of the control unit; and a horizontal deflection output circuit for receiving a driving power, to generate a magnetic field for deflecting electron beams in response to an externally input horizontal driving signal, so as to variably adjust a horizontal center position of a picture displayed on the video display apparatus in accordance with the selective output of the first power and the second power from the horizontal centering compensation circuit.

In the present invention, it is desirable the control unit, such as a microcomputer or microprocessor, counts a frequency of the video synchronizing signals of a video card of a computer system to check the shifting of display modes.

Further, in the present invention, when the display mode is shifted, the control unit, such as the microcomputer or microprocessor, computes picture centering compensation values, and adjusts the direction and the range of a horizontal raster shift in accordance with the computed picture centering compensation values.

Therefore, in accordance with the present invention, in a multi-mode monitor, even when a video card is replaced, a horizontal centering of the picture can be accurately compensated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
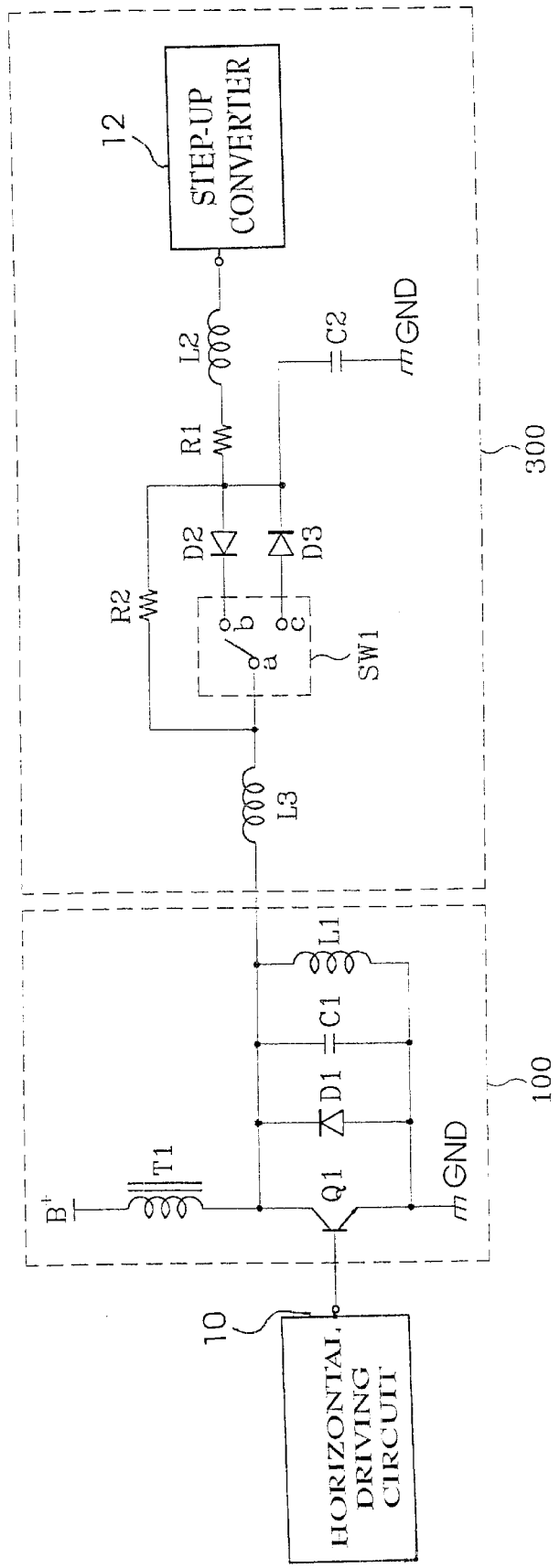
FIG. 1 is a circuit diagram illustrating a conventional horizontal centering compensation circuit for adjusting the horizontal center position of a picture in a video display apparatus.
Figure 2:
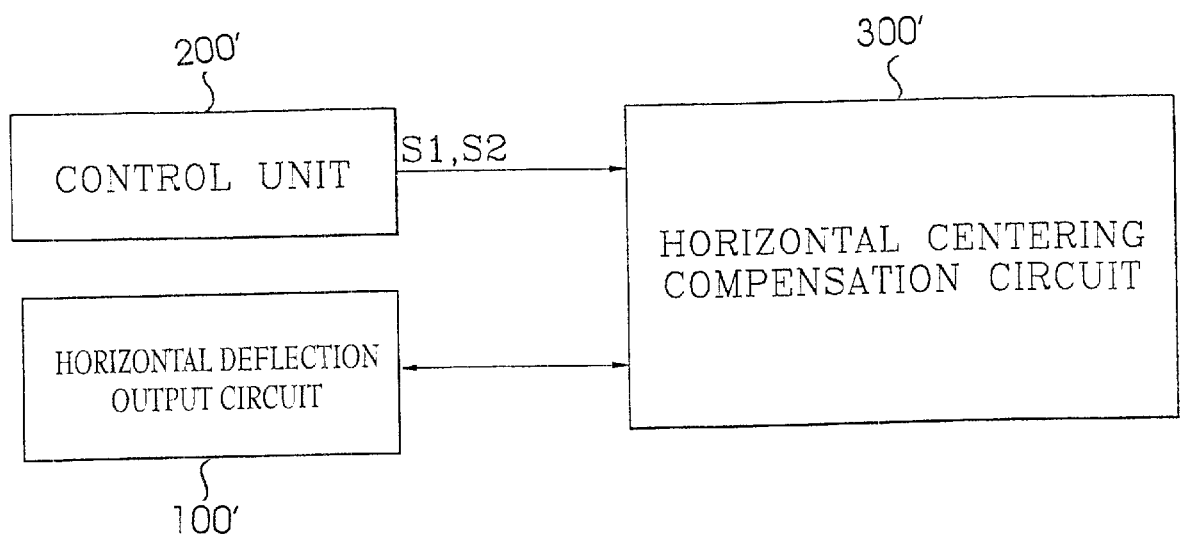
FIG. 2 is a block diagram illustrating an embodiment of a circuit according to the present invention for compensating a horizontal centering of a picture in a video display apparatus.
Figure 3:
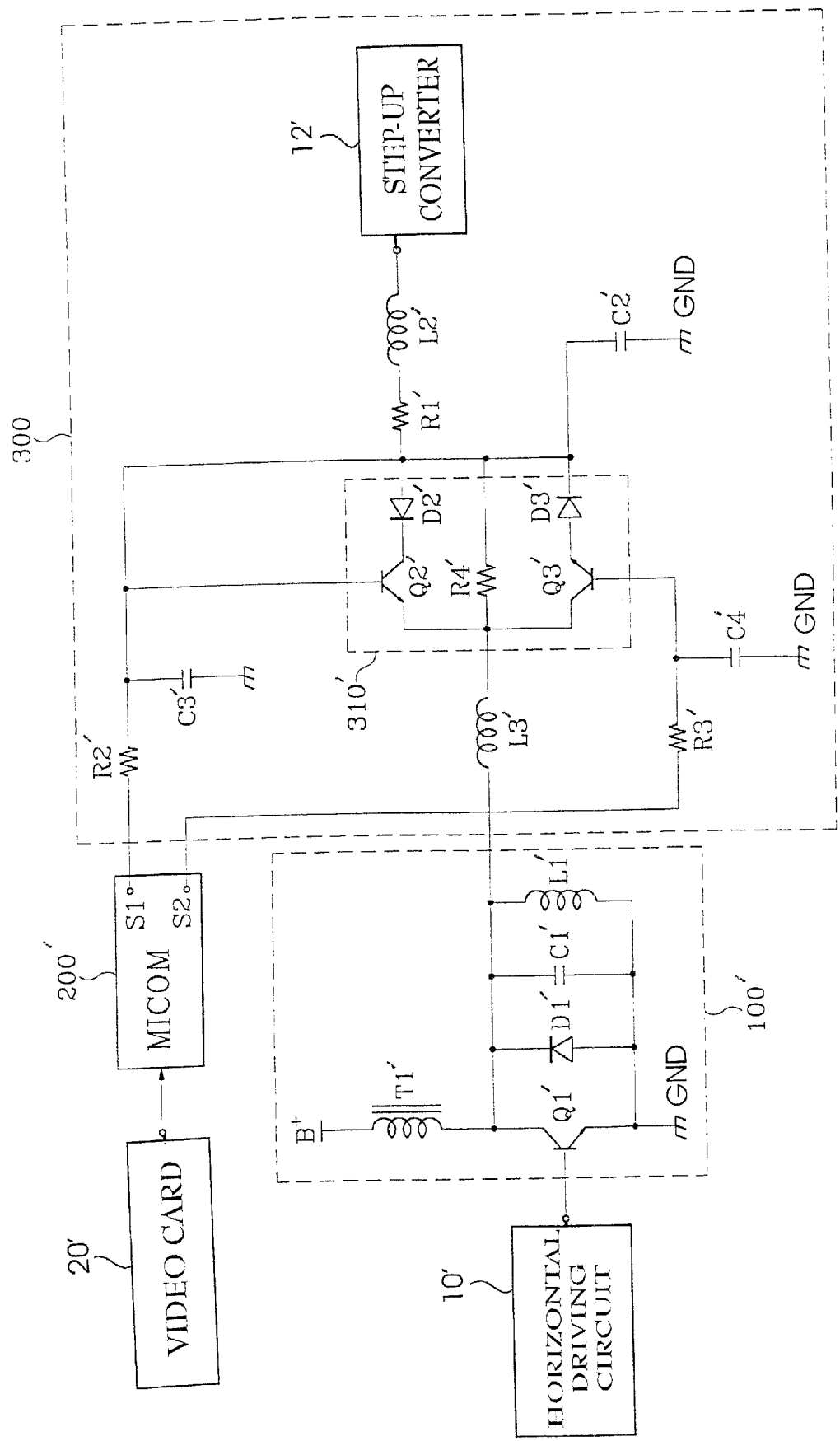
FIG. 3 is a circuit diagram of FIG. 2 illustrating an embodiment of a circuit according to the present invention for compensating a horizontal centering of a picture in a video display apparatus.

Referring now to FIGS. 2 and 3, FIG. 2 is a block diagram showing the constitution of the circuit for compensating the horizontal centering of the picture according to the present invention. FIG. 3 is a circuit diagram of FIG. 2 illustrating an embodiment of a circuit according to the present invention for compensating a horizontal centering of a picture in a video display apparatus.

Referring to FIGS. 2 and 3, the circuit for compensating a horizontal centering in a video display apparatus, such as a monitor for a computer, according to the present invention includes: a control unit 200', such as a microcomputer (MICOM) 200' or a microprocessor 200', for counting a frequency of video synchronizing signals input from a video card 20' to selectively output a first switching control signal S1 and a second switching control signal S2 based on the counted result of the counting of the frequency of the video synchronizing signals; a horizontal centering compensation circuit 300' for receiving a power to provide a first power and a second power, the first power and second power having voltage levels and directions different from each other, to selectively output the first power and the second power in response to the selective output of the first switching control signal S1 and the second switching control signal S2 of the control unit 200'; and a horizontal deflection output circuit 100' for receiving a driving power B+, to generate a magnetic field for deflecting electron beams in response to an externally input horizontal driving signal, such as from a horizontal driving circuit 10', so as to variably adjust a horizontal center position of a picture displayed on the video display apparatus, in accordance with the selective output of the first power and the second power from the horizontal centering compensation circuit 300'.

The horizontal deflection output circuit 100' includes a transformer T1' for transforming the driving power B+ applied to the transformer T1', and a transistor Q1' for receiving the driving power B+ into its collector terminal, to output the driving power B+ to its emitter terminal in response to horizontal driving signals from the horizontal driving circuit 10' applied at its base terminal. The horizontal deflection output circuit 100' also includes a deflecting coil L1' having one end connected to the emitter terminal of the transistor Q1', and having another end connected to the collector terminal of the transistor Q1', the deflecting coil L1' for receiving the selective output of the first power and the second power. The horizontal deflection output circuit 100' further includes a diode D1' having its anode connected between the emitter terminal of the first transistor Q1' and one end of the deflecting coil L1', and having its cathode connected between the collector terminal of the transistor Q1' and the another end of the deflecting coil L1'. Additionally, the horizontal deflection output circuit 100' includes a capacitor C1' connected in parallel to the diode D1' between the diode D1' and the deflecting coil L1'.

The horizontal centering compensation circuit 300' includes a switching section 310' for selectively receiving the first power and the second power to selectively output the first power and the second power in response to the selective output of the first switching control signal S1 and the second switching control signal S2 from the control unit 200'. The horizontal centering compensation circuit 300' also includes a resistor R1' having one end connected to the switching section 310' and includes a coil L2' having one end connected to another end of the resistor R1' and having another end connected to a step-up converter 12' to receive a power from the step-up converter 12' to provide the first power to the switching section 310'. The horizontal centering compensation circuit 300' further includes a capacitor C2' having one end connected to the switching section 310' and also coupled to the end of resistor R1' that is connected to the switching section 310', and having another end grounded (GND) to generate the second power. The horizontal centering compensation circuit 300' additionally includes a horizontal position adjusting coil L3' having one end connected to the switching section 310' and having another end connected to the another end of the deflecting coil L1' to selectively output the first power and the second power from the switching section 310' to the deflecting coil L1'.

The switching section 300' of the horizontal centering compensation circuit 310' includes a diode D2' having its anode connected to one end of the resistor R1' and includes a diode D3' having a cathode connected to one end of the capacitor C2'. The switching section 310' also includes a transistor Q2' having its base terminal receiving the first switching control signal S1, having its collector terminal connected to a cathode of the diode D2' and having its emitter terminal connected to one end of the horizontal position adjusting coil L3', and includes a transistor Q3' having its base terminal receiving the second switching control signal S2, having its collector terminal connected to one end of the horizontal position adjusting coil L3', and having its emitter terminal connected to an anode of the diode D3'. The switching section 310' additionally includes a signal feedback resistor R4' having one end connected to one end of the horizontal position adjusting coil L3', and having another end connected to an anode of the diode D2' and to a cathode of the diode D3'. In the switching section 310', the second and third transistors Q2' and Q3' are desirably NPN transistors, for example.

Further, the horizontal centering compensation circuit 300' includes a resistor R2' having one end receiving the first switching control signal S1 and having another end connected to the base terminal of the transistor Q2' and to the anode of the diode D2', and includes a capacitor C3' having one end connected to the another end of the resistor R2' and having another end connected to ground (GND). The horizontal centering compensation circuit 300' further includes a resistor R3' having one end receiving the second switching control signal S2, and having another end connected to the base terminal of the transistor Q3', and further includes a capacitor C4' having one end connected to the another end of the third resistor R3' and having another end grounded (GND).

Also, the values or types for the various above described components of the horizontal output deflection circuit 100', the horizontal centering compensation circuit of 300', and the control unit 200' can vary and be determined dependent upon the use and application in performing their herein described function in compensating horizontal centering according to the present invention.

Now, compensating horizontal centering in a video display apparatus according to the present invention will be described as to its method and operation referring to the embodiments of the circuits of FIGS. 2 and 3 and following Table 1.

TABLE 1

|   | S1 | S2 | Q2' | Q3' |
|---|----|----|-----|-----|
| 1 | 0  | 0  | OFF | OFF |
| 2 | 0  | 1  | OFF | ON  |
| 3 | 1  | 0  | ON  | OFF |

Referring to Table 1, as shown Table 1 above, the horizontal centering compensating circuitry of the present invention carries out three kinds of operations based on the combinations of the states of the first switching control signal S1 and the second switching control signal S2 which are output by the control unit 200', such as by the microprocessor 200'. A case where the first switching control signal S1 and the second switching control signal S2 are simultaneously high is excluded from the operation of the present invention.

Continuing with reference to Table 1, a first case (1) the first switching control signal S1 and the second switching control signals S2 are not output from the control unit 200'. That is, in the first case (1) where the first switching control signal S1 and the second switching control signals S2 are both in a low state, both the transistors Q2' and Q3' of the switching section 310' are turned off, with the result that the horizontal position adjusting coil L3' is disconnected from both of the transistors Q2' and Q3'. According, in the first case (1) direct current (dc) currents from the coil L2' and the capacitor C2' are not added to the deflecting coil L1'. Therefore, the monitor of a video display apparatus displays a picture corresponding to the current video card timing format of a video card 20'.

Then, in a second case (2), referring to Table 1, if the mode of the video card 20' of a computer system is shifted, and if the first switching control signal S1 is output with a low level state, and if the second switching control signal S2 is output with a high level state, then the second transistor Q2' is maintained in a turned-off status, while the third transistor Q3' is maintained in a turned-on status. Accordingly, in the second case (2), the horizontal position adjusting coil L3' is grounded through the diode D3' and the capacitor C2' which are forwardly connected to the transistor Q3'. Consequently, in the second case (2), a direct current (dc) current with a certain magnitude and direction is supplied to the deflecting coil L1'. Then, the picture horizontal center position in a video display apparatus, such as in a monitor for a computer system, moves in accordance with the direction and degree of the horizontal raster shift which is adjusted by the impedance of the capacitor C2' which is in turn connected to the diode D3' and the horizontal position adjusting coil L3'.

Meanwhile, in a third case (3), referring to Table 1, if the mode of the video card 20' of the computer system is shifted, and if the first switching control signal S1 becomes in a high state, and if the second switching control signal S2 becomes in a low state, then the transistor Q2' is maintained in a turned-on status, while the transistor Q3' is maintained in a turned-off status. Accordingly, in the third case (3), the output signal of the step-up converter 12' is supplied through the coil L2' and the resistor R1' to the diode D2'. Under this condition in the third case (3), the diode D2' is forwardly connected with respect to the step-up converter 12' and, therefore, the output signals of the step-up converter 12' are supplied through the diode D2' and the transistor Q2' to the horizontal position adjusting coil L3'. Consequently, in the third case (3), a direct current (dc) current which is opposite and different from the direction and magnitude of the above described direct current (dc) current in the second case (2) of the second operation status is supplied to the deflecting coil L1'. Thus, the picture horizontal center position in a video display apparatus, such as in a monitor for a computer system, moves in accordance with the direction and degree of the horizontal raster shift which is adjusted by the impedance of the horizontal position adjusting coil L3' and by the impedance of the resistor R1' and the coil L1'. In this third operation status in the third case (3), the movement direction of the horizontal center position is opposite to that of the above described second operation status in the second case (2).

According to the present invention as described above, the control unit 200', such as microcomputer 200' or microprocessor 200', always counts the frequency of the synchronization signals which are input from the video card 20' of the computer system, thereby checking the presence or absence of the display mode shift. Further, control unit 200' or microprocessor 200', such as the microcomputer 200', computes the correction value of the horizontal position of the picture displayed on a video display apparatus upon encountering a display mode shift, and controls the direction and range of the horizontal raster shift based on the computed result. Therefore, according to the present invention, even when the video card 20' is replaced in a multi-mode monitor, the horizontal centering of the picture displayed on a video display apparatus can be exactly compensated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for compensating a horizontal centering in a video display apparatus, comprising:

a control unit for counting a frequency of video synchronizing signals to selectively output a first switching control signal and a second switching control signal based on a counted result of the frequency of the video synchronizing signals;

a horizontal centering compensation circuit for providing a first power and a second power, said first power and said second power having voltage levels and directions different from each other, said horizontal centering compensation circuit selectively outputting said first power and said second power in response to a respective one of said first switching control signal and said second switching control signal from said control unit; and a horizontal deflection output circuit for receiving a driving power to generate a magnetic field for deflecting electron beams in said video display apparatus in response to a horizontal driving signal, said horizontal deflection output circuit variably adjusting a horizontal center position of a picture displayed on said video display apparatus in accordance with a selective output of said first power and said second power received from said horizontal centering compensation circuit.

2. The circuit as claimed in claim 1, further comprised of said horizontal deflection output circuit comprising:

a transistor for receiving a driving power into a collector terminal of said transistor, said transistor outputting the driving power to an emitter terminal of said transistor in response to horizontal driving signals received at a base terminal of said transistor; and a deflecting coil having one end connected to the emitter terminal of said transistor, and having another end connected to the collector terminal of said transistor, said deflecting coil receiving the selective output of said first power and said second power from said horizontal centering compensation circuit.

3. The circuit as claimed in claim 2, further comprised of said horizontal centering compensation circuit comprising:

a switching section for selectively receiving said first power and said second power to selectively output said first power and said second power in response to a respective one of said first switching control signal and said second switching control signal;

a resistor having one end connected to said switching section;

a coil having one end connected to another end of said resistor and having another end connected to a step-up converter to provide said first power;

a capacitor having one end connected to said switching section and having another end grounded to generate said second power; and a horizontal position adjusting coil having one end connected to said switching section and having another end connected to said another end of said deflecting coil to selectively output said first power and said second power from said switching section to said deflecting coil.

4. The circuit as claimed in claim 3, further comprised of said switching section comprising:

a first diode having an anode connected to said one end of said resistor;

a second diode having a cathode connected to said one end of said capacitor;

a first transistor having a base terminal for receiving said first switching control signal, having a collector terminal connected to a cathode of said first diode, and having an emitter terminal connected to said one end of said horizontal position adjusting coil;

a second transistor having a base terminal for receiving said second switching control signal, having a collector terminal connected to said one end of said horizontal position adjusting coil, and having an emitter terminal connected to an anode of said second diode; and a signal feedback resistor having one end connected to said one end of said horizontal position adjusting coil and having another end connected to said anode of said first diode and to said cathode of said second diode.

5. The circuit as claimed in claim 4, further comprised of said first transistor of said switching section and said second transistor of said switching section each comprising a NPN transistor.

6. The circuit as claimed in claim 4, further comprised of said horizontal centering compensation circuit further comprising:

a second resistor having one end connected to said control unit to receive said first switching control signal and having another end connected to said base terminal of said first transistor of said switching section and to said anode of said first diode of said switching section;

a second capacitor having one end connected to said another end of said second resistor and having another end grounded;

a third resistor having one end connected to said control unit to receive said second switching control signal and having another end connected to said base terminal of said second transistor of said switching section; and a third capacitor having one end connected to said another end of said third resistor and having another end grounded.

7. The circuit as claimed in claim 6, further comprised of said control unit comprising a microprocessor.

8. The circuit as claimed in claim 6, further comprised of said control unit comprising a microcomputer.

9. The circuit as claimed in claim 6, further comprised of said first transistor of said switching section and said second transistor of said switching section each comprising a NPN transistor.

10. The circuit as claimed in claim 1, further comprised of said control unit comprising a microprocessor.

11. The circuit as claimed in claim 1, further comprised of said control unit comprising a microcomputer.

12. The circuit as claimed in claim 1, further comprised of said horizontal centering compensation circuit comprising:
   a switching section for selectively receiving said first power and said second power to selectively output said first power and said second power in response to a respective one of said first switching control signal and said second switching control signal;
   a resistor having one end connected to said switching section;
   a coil having one end connected to another end of said resistor and having another end connected to a step-up converter to provide said first power;
   a capacitor having one end connected to said switching section and having another end grounded to generate said second power; and
   a horizontal position adjusting coil having one end connected to said switching section and having another end connected to an end of a deflecting coil of said horizontal deflection output circuit to selectively output said first power and said second power from said switching section to said deflecting coil.

13. The circuit as claimed in claim 12, further comprised of said switching section comprising:
   a first diode having an anode connected to said one end of said resistor;
   a second diode having a cathode connected to said one end of said capacitor;
   a first transistor having a base terminal for receiving said first switching control signal, having a collector terminal connected to a cathode of said first diode, and having an emitter terminal connected to said one end of said horizontal position adjusting coil;
   a second transistor having a base terminal for receiving said second switching control signal, having a collector terminal connected to said one end of said horizontal position adjusting coil, and having an emitter terminal connected to an anode of said second diode; and
   a signal feedback resistor having one end connected to said one end of said horizontal position adjusting coil and having another end connected to said anode of said first diode and to said cathode of said second diode.

14. The circuit as claimed in claim 13, further comprised of said first transistor of said switching section and said second transistor of said switching section each comprising a NPN transistor.

15. The circuit as claimed in claim 13, further comprised of said horizontal centering compensation circuit further comprising:
   a second resistor having one end connected to said control unit to receive said first switching control signal and having another end connected to said base terminal of said first transistor of said switching section and to said anode of said first diode of said switching section;
   a second capacitor having one end connected to said another end of said second resistor and having another end grounded;
   a third resistor having one end connected to said control unit to receive said second switching control signal and having another end connected to said base terminal of said second transistor of said switching section; and
   a third capacitor having one end connected to said another end of said third resistor and having another end grounded.

16. The circuit as claimed in claim 15, further comprised of said first transistor of said switching section and said second transistor of said switching section each comprising a NPN transistor.

17. The circuit as claimed in claim 12, further comprised of said control unit comprising a microprocessor.

18. The circuit as claimed in claim 12, further comprised of said control unit comprising a microcomputer.

19. A method for compensating a horizontal centering in a video display apparatus, comprising the steps of:
   counting a frequency of video synchronizing signals by a control unit to selectively output a first switching control signal and a second switching control signal based on a counted result of the frequency of the video synchronizing signals;
   selectively generating by a horizontal centering compensation circuit a first power and a second power having voltage levels and directions different from each other in response to a respective one of said first switching control signal and said second switching control signal from said control unit;
   providing a driving power to a horizontal deflection output circuit to generate a magnetic field for deflecting electron beams in said video display apparatus in response to a horizontal driving signal; and
   variably adjusting by said horizontal deflection output circuit a horizontal center position of a picture displayed on said video display apparatus in accordance with a selective output of said first power and said second power from said horizontal centering compensation circuit.

20. A method for compensating a horizontal centering in a video display apparatus, comprising the steps of:
   counting a frequency of video synchronizing signals to selectively generate a first switching control signal and a second switching control signal based on a counted result of the frequency of the video synchronizing signals;
   generating selectively a first power and a second power, said first power and said second power having voltage levels and directions different from each other, in response to selective generation of a respective one of said first switching control signal and said second switching control signal;
   generating a magnetic field for deflecting electron beams in said video display apparatus in response to a horizontal driving signal; and
   variably adjusting a horizontal center position of a picture displayed on said video display apparatus in accordance with selective generation of said first power and said second power.

* * * * *